(12) United States Patent
Chen et al.

(10) Patent No.: US 9,405,801 B2
(45) Date of Patent: Aug. 2, 2016

(54) PROCESSING A DATA STREAM

(75) Inventors: Qiming Chen, Cupertino, CA (US); Meichun Hsu, Los Altos Hills, CA (US); Ren Wu, San Jose, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 578 days.

(21) Appl. No.: 12/703,574

(22) Filed: Feb. 10, 2010

(65) Prior Publication Data

US 2011/0196856 A1 Aug. 11, 2011

(51) Int. Cl.
*G06F 17/30* (2006.01)

(52) U.S. Cl.
CPC ................ *G06F 17/30516* (2013.01)

(58) Field of Classification Search
USPC ........................................................ 707/713
See application file for complete search history.

(56) References Cited

U.S. PATENT DOCUMENTS

| 7,403,959 | B2 | 7/2008 | Nishizawa et al. | |
|---|---|---|---|---|
| 2003/0212664 | A1* | 11/2003 | Breining et al. | 707/3 |
| 2006/0100969 | A1 | 5/2006 | Wang et al. | |
| 2009/0106190 | A1 | 4/2009 | Srinivasan et al. | |
| 2009/0204551 | A1 | 8/2009 | Wang et al. | |

OTHER PUBLICATIONS

Chuck Cranor et al., "Gigascope: A Stream Database for Network Applications", SIGMOD 2003, Jun. 9-12, 2003, San Diego, California, p. 647-651.

Jennifer Widom et al., "CQL: A Language for Continuous Queries Over Streams and Relations", DBPL, 2003, p. 1-62.

Daniel J. Abadi et al., "Aurora: A New Model and Architecture for Data Stream Management", The VLDB Journal, 2003, p. 1-20.

Jianjun Chen et al., "Niagra CQ: A Scalable Continuous Query System for Internet Databases", SIGMOD 2000, 12 pages.

Ulf Schreier et al., "Alert: An Architecture for Transforming a Passive DBMS Into an Active DBMS", Proceedings of the 17th International Conference on Very Long Data Bases, Barcelona, Spain, Sep. 1991, p. 469-478.

Michael J, Franklin et al., "Continuous Analytics: Rethinking Query Processing in a Network-Effect World", CIDR Perspectives 2009, 6 pages.

Rakesh Agrawal et al., "The Claremont Report on Database Research", May 2008, Berkeley, California, http://db.cs.berkeley.edu/claremont/, 11 pages.

Sirish Chandrasekaran et al., "Telegraph CQ: Continuous Dataflow Processing for an Uncertain World", Proceedings of the 2003 CIDR Conference, 12 pages.

Shivnath Babu et al., "Continuous Queries Over Data Streams", SIGMOD Record, 2001, 12 pages.

Hyo-Sang Lim et al., "Continuous Query Processing in Data Streams Using Duality of Data and Queries", SIGMOD 2006, Jun. 27-29, 2006, Chicago, Illinois, p. 313-324.

(Continued)

*Primary Examiner* — Amresh Singh
(74) *Attorney, Agent, or Firm* — International IP Law Group, PLLC

(57) ABSTRACT

Methods, database management systems ("DBMS") and computer-readable media are provided for processing unbounded stream data using a traditional DBMS. Execution of a query that includes a data stream as a data source may be initiated. Tuples may be processed in accordance with the query as the tuples are received through the data stream until an indication is received that execution of the query should cease.

19 Claims, 2 Drawing Sheets

(56) References Cited

OTHER PUBLICATIONS

Samuel Madden et al., "Continuously Adaptive Continuous Queries Over Streams", ACM SIGMOD 2002, Jun. 4-6, 2002, Madison, Wisconsin, 12 pages.
Milena Ivanova et al., "Customizable Parallel Execution of Scientific Stream Queries", Proceedings of the 31st VLDB Conference, Trondheim, Norway, 2005, p. 157-168.
Navendu Jain et al., "Design, Implementation, and Evaluation of the Linear Road Benchmark on the Stream Processing Core", SIGMOD 2006, Jun. 27-29, 2006, Chicago, Illinois, 12 pages.
M. Kersten et al., "A Query Language for a Data Refinery Cell", EDA-PS 2007, Sep. 24, 2007, Vienna, Austria, 9 pages.
Erietta Liarou et al., "Exploiting the Power of Relational Databases for Efficient Stream Processing", EDBT 2009, Mar. 24-26, 2009, Saint Petersburg, Russia, 12 pages.
Arvind Arasu et al., " Linear Road: A Stream Data Management Benchmark", Proceedings of the 30th VLDB Conference, Toronto, Canada, 2004, p. 480-491.
Neil Conway, "CISC 499: Transactions and Data Stream Processing", Thesis, Apr. 6, 2008, 28 pages.
M.A. Hammad et al., Nile: A Query Processing Engine for Data Streams, Proc. ICDE Conf., 2004, 1 page.
Joshua Lee et al., Presentation of "On-the-Fly Sharing for Streamed Aggregation" 17 pages (excerpted from Proceedings of the 2006 ACM SIGMOD International Conference on Management of Data, Jun. 27-29, 2006, Chicago, Illinois, p. 623-634).
Brian Babcock et al., "Operator Scheduling in Data Stream Systems", VLDB Journal Manuscript, 44 pages.
Stavros Harizopoulos et al., "QPipe: A Simultaneously Pipelined Relational Query Engine", SIGMOD 2005, Jun. 14-16, 2005, Baltimore, Maryland, 12 pages.
Arvind Arasu et al., "Resource Sharing in Continuous Sliding-Window Aggregates", Proceedings of the 30th VLDB Conference, Toronto, Canada, 2004, p. 336-347.
Hari Balakrishnan et al., "Retrospective on Aurora", VLDB Journal Manuscript, 2004, 16 pages.
Lewis Girod et al., "The Case for a Signal-Oriented Data Stream Management System," 3rd Biennial Conference on Innovative Data Systems Research (CIDR), Jan. 7-10, 2007, Asiolmar, California, 10 pages.
Arvind Arasu et al., "The CQL Continuous Query Language: Semantic Foundations and Query Execution", VLDB Journal, Jun. 2006, 32 pages.
Daniel J. Abadi et al., "The Design of the Borealis Steam Processing Engine", Proceedings of the 2005 CIDR Conference, 13 pages.
Minos Garofalakis et al., "Querying and Mining Data Streams: You Only Get One Look", ACM SIGMOD 2002, Jun. 4-6, 2002, Madison, Wisconsin, 1 page.

\* cited by examiner

PROCESSING A DATA STREAM

BACKGROUND

Operational business intelligence ("BI") applications often derive critical information from continuously collected data through stream processing. Stream processing is characterized by processing data first and then optionally storing the results in a data sink such as a database. Dynamically collected data from a data stream and static data from a database may be used in combination. However, separate data stream management systems ("DSMS") and database management systems ("DBMS") typically are deployed to access information from these separate yet often related sources.

Although processing power has increased greatly in recent years, the increase in data bandwidth has been much less dramatic. For large enterprises, the amount of data that is transferred from a data stream to a data warehouse is becoming extremely large, creating a considerable bottleneck in the BI process. Moreover, when the data set required for analytics is large, a DSMS may be overly burdened with data management issues (e.g., data structure, layout, indexing, buffer management, storage) that are better handled by a DBMS. Many of these issues also may be handled at the application level, but this introduces security concerns, with potentially-sensitive data being cached in files of various BI applications.

Rather than gathering data directly from a data stream, some DSMS are connected to a database that is used to temporarily store captured stream data. This type of DSMS provides users with the mature data management capabilities of a DBMS. However, it also requires that data be written to disk first, which introduces significant overhead from disk reads and writes. Some systems support continuous queries for monitoring a change in persistent data using cursors and other similar features. However, this approach still requires that streamed data be stored first and processed later.

Other DSMS are provided with custom-built data management facilities to deal with data in a data stream more directly. These DSMS may operate more efficiently than DSMS that are connected to a data sink. However, the custom data management capabilities employed by these DSMS typically are built from scratch and are not necessarily compatible with other data systems. Moreover, they fail to take advantage of the mature data management capabilities of a DBMS.

One approach that attempts to address these shortcomings is to build a DSMS on top of a DBMS so that the DBMS includes stream processing capabilities. A database query is executed a number of times on "chunks" of stream elements. A problem with this approach is that the frequent set-up and tear-down of database queries introduces significant computational overhead, and cannot meet the efficiency requirements of particularly data-intensive BI applications. Moreover, this approach often requires the use of a centralized scheduler to control the frequency at which a query is executed.

DETAILED DESCRIPTION

Figure 1:
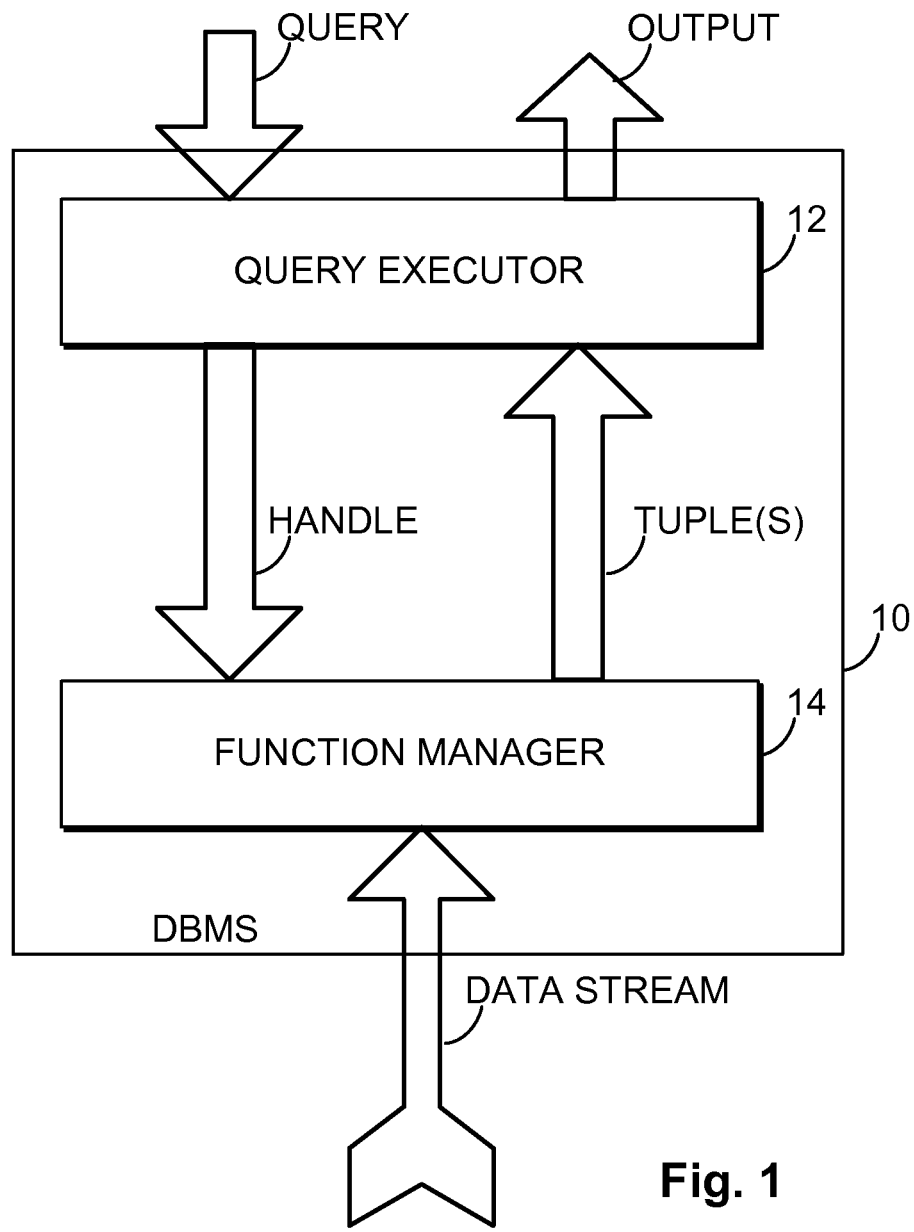
FIG. 1 depicts schematically a DBMS configured to process stream data, according to an embodiment of the invention.

Methods, database management systems ("DBMS") and computer-readable media are provided for processing unbounded stream data using a traditional DBMS. A query that includes a data stream as a data source may be executed once as a single, long-standing, continuously-executing query. The data stream may be included in the query as a function that returns one or more tuples. An unlimited number of tuples may be processed in accordance with one or more operators defined in the query as the tuples are received through the data stream. The single, long-standing query may execute continuously until an indication is received that the query should cease. Because only a single query is executed, it is only necessary to set up and tear down the query once.

The term "query" as used herein is meant to refer to a query that may be used in a DBMS. Although the Structured Query Language ("SQL") is used herein repeatedly in exemplary queries, this should not be construed as limiting, as the methods and systems described herein may be applied to a DBMS that utilizes other query languages.

A DBMS typically includes a number of components. One component is referred to herein as a "query executor," and also may be referred to as a "query engine." The query executor may be software executing on one or more processors that receives a query as input and operates on a database in accordance with the query; i.e. the query executor "executes," "runs" or "performs" the query to interact with data in a database.

When executing a query, a query executor may "process" one or more tuples retrieved from a database table or, as will be described below, from a data stream, in accordance with one or more operators that are defined in the query. For example, a query "SELECT name, MAX score FROM high_scorers" includes an operator, MAX. A query executor executing this query may process tuples by selecting the maximum score. For example, assume the table high_scorers includes the following data: <Name: Johnson, Score: 39; Name: Howard, Score: 25; Name: Jordan, Score: 38; Name: Rose, Score 22>. When these tuples are processed by a query executor in accordance with the above-described query, the maximum score (39) and associated name (Johnson) are selected and sent by the query executor to a downstream destination, such as storage in a database table or to a user application.

Another DBMS component that plays a role in disclosed methods and systems is referred to herein as a "function manager." The function manager may be software executing on one or more processors that executes functions that are included in queries. Functions in queries may be user-defined and may come in various forms, such as scalar, aggregate, table-valued functions ("TVF") and table functions. As used herein, the term "relation-valued function" is a generalization of various types of functions, including those just mentioned, that may be included in a query.

A "stream source function" ("SSF") is a special type of relation-valued function that receives streaming data as input and outputs one or more tuples. An SSF is well-suited for inclusion in traditional database queries to process streaming data because it provides data to the query executor in a similar manner as a traditional data source such as a database table. When executing a traditional database query, a query executor may scan through each record of a database table one-by-one, processing the tuples contained therein, until the database table runs out of records; at that point the query may terminate. Tuples returned from the SSF likewise may be scanned and processed, just as records in a traditional database table are scanned and processed. The difference is that a traditional database table is finite, and so a scan of the table ends when the data runs out. In contrast, tuples may be returned from an SSF ad infinitum. Accordingly, a query executor may receive an indication that execution of the query should cease. For example, an end-of-data operator may be used, as a return value from the SSF for instance, to cause execution of the single, long-standing, continuous query to terminate. Otherwise, the query executor may continue to execute the query forever.

FIG. 1 depicts an exemplary DBMS 10 that has been extended to process data from a data stream, in accordance with an embodiment of the invention. DBMS 10 includes a query executor 12 and a function manager 14. Query executor 12 may receive a query that includes a data stream as a data source. In some embodiments, the data source is included in the query as an SSF that receives a data stream as input and outputs data in a form suitable for processing by query executor 12, such as in tuple-form.

When query executor 12 begins execution of the query, it may determine that the query includes an SSF as a data source. Query executor 12 may then initiate a data structure and pass a handle to memory allocated to the data structure to function manager 14, as will be described below. Function manager 14 may execute the SSF contained in the query using a data stream as input. Function manager 14 may return one or more tuples from the function to query executor 12. Query executor 12 may then process the returned tuples in accordance with one or more operators defined in the query.

A DBMS may be extended to handle a SSF in a manner similar to the way the DBMS handles other types of user-defined functions. A function for use in a database query may be coded with three cases: FIRST_CALL, NORMAL_CALL and LAST_CALL (also referred to as INIT_CALL, NEXT_CALL and FINAL_CALL). Instructions coded under the FIRST_CALL case may be executed once, the first time the function is called, and the query may provide initial data (e.g., scalar values). Instructions coded under the NORMAL_CALL case may be executed in each call, including the first call, for processing input to the function. That means instructions coded under NORMAL_CALL may be executed multiple times, if the function is called one tuple at a time. Instructions coded under the LAST_CALL case may be executed after the last NORMAL_CALL, for cleanup purposes. Query executor 12 may track the number of times the function is called during processing. Query executor 12 also may check an end-of-data condition each time it receives data returned from the function, for determining which case is applicable the next time the function is called.

In some embodiments, a query executor in a traditional DBMS is extended to perform functions described herein by adding a function-streaming operator as an additional data scan method. A function-streaming operator may be invoked when a function contained in a query is an SSF. A function-streaming operator may run multiple (theoretically infinite) times, once for each stream element received. Existing scan methods typically materialize an entire set of data as a chunk and then retrieve materialized tuples one-by-one from the chunk. In contrast, the function-streaming scan operator obtains each tuple by calling an SSF one or more times, and immediately returns these tuples for processing by the query executor.

A tuple returned from an SSF may not always survive processing by the query executor. For example, assume the following query, which seeks double-digit scores: SELECT name, score WHERE score>9 FROM daily_scores( ). This query includes a single operator, greater than (>), which causes a name and score to be selected if the score is greater than 9. Assume that the user-defined function daily_scores( ) returns one tuple at a time, and that each tuple contains an individual's score (e.g., <Name: Johnson, Score: 39>). A query executor executing this query receives one tuple at a time from daily_scores( ) and processes each tuple by either passing it on if the score is greater than 9, or by dropping the tuple.

Figure 2:
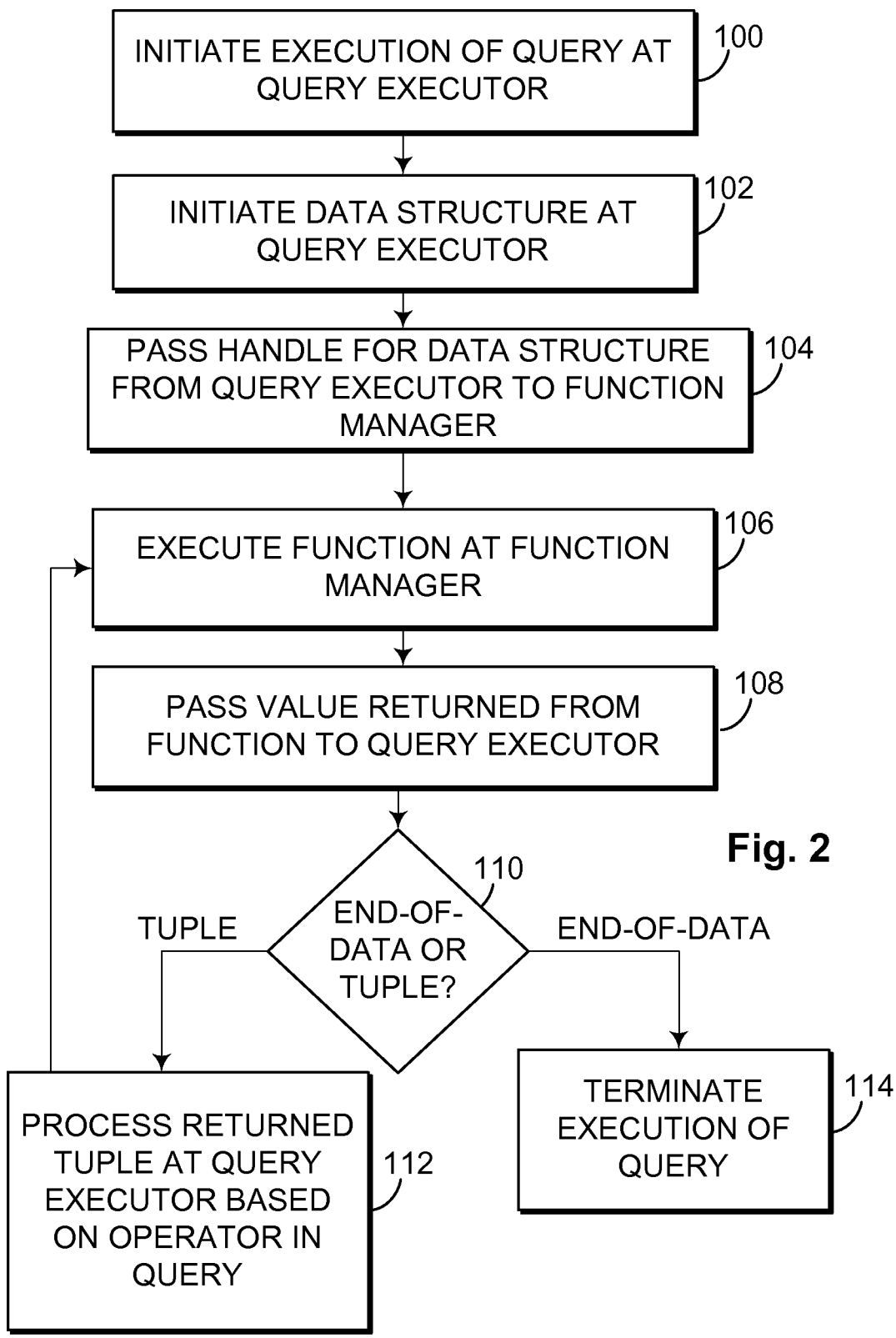
FIG. 2 depicts a method of processing stream data using existing DBMS, according to an embodiment of the invention.

FIG. 2 depicts an exemplary process of using a DBMS to process data from a data stream. Although a particular sequence of steps is shown, it should be understood that one or more of these steps may be omitted, and the sequence in which the steps are performed may be altered.

In step 100, a query executor such as query executor 12 in FIG. 1 may receive and initiate execution of a query. This may include creating an executor state and a per-query context. The query executor may switch to the per-query context and recursively scan a query tree representing the query to create an expression context.

Upon determining that a data source in the query is an SSF (e.g., during a recursive scan of a query tree), the query executor may initiate a data structure in step 102 and allocate memory to the data structure. The data structure may be used for, among other things, passing information between the query executor and the function manager and retaining state information relating to the SSF. In some embodiments, query executor also initiates a handle to the memory allocated to the data structure, so that the query executor may pass the handle to a function manager in step 104.

At step 106, a function manager such as function manager 14 may execute the SSF that was included in the query as a data source. Execution of the SSF may begin with the function manager receiving a handle to the memory allocated to the aforementioned data structure from the query executor. The function manager may execute the SSF using memory referenced by the handle. Because the function is an SSF, the function manager may receive data from a data stream as input and return data in a format suitable for processing by the query executor.

The function manager may operate repeatedly on the same memory referenced by the handle to the data structure. In this way, the query can be executed indefinitely and the memory required by the function will never exceed a predetermined and controlled amount.

A function in a query, such as an SSF, may be event-driven. For example, an SSF may be configured to return a value such as a tuple upon the occurrence of one of a predetermined set of events. Examples of events that may cause an SSF to return a tuple include the receipt of a predetermined number of data points (e.g., 1000), the passage of a predetermined amount of time (e.g., 1 minute), or the occurrence of a predetermined number of events (e.g., where each event is the receipt of a scores from a particular game, a tuple may be returned upon the receipt of scores from five games). An SSF may operate using a sliding window algorithm as well.

Returning to FIG. 2, in step 108, the function manager may provide a value returned from the function to the query executor. An SSF may return values based on an invocation pattern used to call the function. A particular invocation pattern represents a specific style for processing the SSF so that it may return data in a particular form. Calling the SSF with a different invocation pattern may cause the SSF to return data in a different form. This allows a query containing an SSF to interact with various types of applications.

An SSF also may have various return modes. One return mode, TUPLE_MODE, may cause one tuple to be returned per SSF call. Instructions coded under the NORMAL_CALL case may be executed multiple times, each generating one output tuple. Another return mode, SET_MODE, may cause an entire set of tuples to be returned in a single call, which means instructions coded under the NORMAL_CALL may be executed a single time.

In the exemplary process shown in FIG. 2, the value returned from the function in step 108 is either a tuple or an end-of-data indication. In some embodiments, tuples returned from an SSF may be stored in the data structure. If the data structure is not already accessible by the query executor, then the function manager may pass the handle referencing the memory allocated to the data structure back to the query executor. In other embodiments, a function manager and a query executor may exchange data returned from an SSF using a sliding window algorithm.

At step 110, the query executor may determine whether the value returned from the function is a tuple or an end-of-data indication. If the value is a tuple, then the query executor may process the tuple at step 112 in accordance with one or more operators in the query. For example, assume that a query reads as follows: SELECT * WHERE score>9 from daily_scores( ). This query includes one operator, greater than (>), which is used to process tuples returned from the function. So if the function returns a single tuple <Name: Johnson; Score: 38>, the query executor will process this tuple with the > operator to determine that the score is greater than 9. Accordingly, the query executor may pass the processed tuple on as output to whatever the next step may be (e.g., for storage in a database or to a user application).

As noted above, in some embodiments, tuples are passed from the function manager to the query executor one tuple at a time (i.e. TUPLE_MODE). In other embodiments, the function may be event-driven to return sets of tuples (i.e. SET_MODE) upon the occurrence of a predetermined event (e.g., receipt of 100 values over the data stream), or upon the passage of a predetermined amount of time (e.g., every 2 minutes). While data may be received at the function in various formats through a data stream, the function may return tuples which are in a format suitable for processing by a query executor. For example, the function may return a tuple that is suitable for an operator defined in the query.

Returning to FIG. 2, at step 110, if the query executor determines that the value returned from the function is an end-of-data operator, then the query executor may terminate execution of the query at step 114. An end-of-data operator may be any sequence of computer-readable symbols. The end-of-data operator may serve as a delimiter to otherwise unbounded data that is processed by the query executor while executing a query. In some embodiments, the end-of-data operator is defined in the data structure that is initiated by the query executor. In some embodiments, instructions coded under the FINAL_CALL case may be executed upon the SSF obtaining and/or returning an end-of-data operator (e.g., as defined in the data structure). These instructions may be configured to perform cleanup (e.g., memory de-allocation).

The disclosure set forth above may encompass multiple distinct embodiments with independent utility. The specific embodiments disclosed and illustrated herein are not to be considered in a limiting sense, because numerous variations are possible. The subject matter of this disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether directed to a different embodiment or to the same embodiment, and whether broader, narrower, equal, or different in scope to the original claims, also are regarded as included within the subject matter of the present disclosure.

Where the claims recite "a" or "a first" element or the equivalent thereof, such claims include one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

We claim:

1. A method of processing a data stream, comprising:
   initiating execution of a query that includes the data stream as a data source, wherein the query specifies an invocation pattern for the data stream; and
   processing tuples in accordance with the query as the tuples are received through the data stream until an indication is received that execution of the query should cease, wherein the data stream is included in the query as a relation-valued function that returns one or more tuples in a return mode based on the invocation pattern, wherein the return mode comprises one of a tuple mode returning one tuple and a set mode returning multiple tuples.

2. The method of claim 1, wherein the data stream is included in the query as a stream source function that returns a tuple in a format suitable for an operator defined in the query.

3. The method of claim 1, wherein the relation-valued function is event-driven.

4. The method of claim 1, wherein the relation-valued function returns a tuple upon an occurrence of one of a predetermined number of events or passage of a predetermined amount of time.

5. The method of claim 1, further comprising:
   initiating, at a query executor configured to execute the query, a handle to memory allocated to a data structure for use by the relation-valued function; and
   passing the handle from the query executor to the relation-valued function.

6. The method of claim 5, wherein the handle references memory that is used to store a state of the relation-valued function.

7. The method of claim 5, further comprising:
   storing a tuple returned from the relation-valued function in the data structure; and
   passing the handle from the relation-valued function to the query executor.

8. The method of claim 5, wherein the indication that execution of the query should cease includes an end-of-data operator.

9. The method of claim 8, further comprising:
   passing the end-of-data operator from the relation-valued function to the query executor; and
   terminating execution of the query at the query executor.

10. The method of claim 8, wherein the end-of-data operator is defined in the data structure.

11. A database management system configured to process data streams, comprising:
    a query executor executing on one or more hardware processors and being configured to:
    receive a query that includes a data stream as a data source, wherein the data stream is included in the query as a relation-valued function, and wherein the query specifies an invocation pattern for the data stream; and process tuples based on the invocation pattern, as they are returned from a function manager executing the relation-valued function, in accordance with the query;

a function manager executing on one or more processors and being configured to:

execute the relation-valued function included in the query to return one or more tuples to the query executor in a return mode based on the invocation pattern, wherein the return mode comprises one of a tuple mode returning one tuple and a set mode returning multiple tuples.

12. The database management system of claim 11, wherein the query executor is further configured to initiate a data structure for use by the function manager in executing the relation-valued function, and the function manager is configured to receive a handle to the data structure as input for the relation-valued function.

13. The database management system of claim 11, wherein the query executor is further configured to process tuples as they are returned by the function manager from the relation-valued function until an indication is received that the query should cease.

14. The database management system of claim 13, wherein the relation-valued function receives input data from the data stream.

15. The database management system of claim 11, wherein the relation-valued function is an event-driven function.

16. The database management system of claim 15, wherein the relation-valued function returns a tuple upon an occurrence of one of a predetermined number of events or passage of a predetermined amount of time.

17. A non-transitory computer-readable storage medium having computer-executable instructions for executing traditional database queries using a data stream as a data source, the instructions causing a computer to perform steps comprising:

initiating execution of a traditional database query that includes, as a data source, a relation-valued function which receives a data stream as input, wherein the traditional database query specifies an invocation pattern for the data stream; and processing one or more tuples as they are returned from the relation-valued function in accordance with an operator defined in the traditional database query, and in a return mode based on the invocation pattern, until the relation-valued function returns an indication that the traditional database query should cease, wherein the return mode comprises one of a tuple mode returning one tuple and a set mode returning multiple tuples.

18. The computer-readable storage medium of claim 17, further including computer-executable instructions for:

initiating, at a query executor configured to process the tuples in accordance with the operator defined in the traditional database query, a handle to a data structure for use by the relation-valued function; and passing the handle from the query executor to a function manager that executes the relation-valued function.

19. The computer-readable storage medium of claim 17, wherein the relation-valued function returns a tuple upon an occurrence of one of a predetermined number of events or passage of a predetermined amount of time.

* * * * *